US00RE43953E

(19) United States
(12) Reissued Patent
Troyer, Jr.

(10) Patent Number: US RE43,953 E
(45) Date of Reissued Patent: Feb. 5, 2013

(54) SYSTEM TO FEED ANIMALS

(76) Inventor: John Troyer, Jr., Orrville, OH (US)

(21) Appl. No.: 13/112,818

(22) Filed: May 20, 2011

Related U.S. Patent Documents

Reissue of:
(64) Patent No.: 7,543,548
Issued: Jun. 9, 2009
Appl. No.: 11/927,076
Filed: Oct. 29, 2007

(51) Int. Cl.
*A01K 5/02* (2006.01)

(52) U.S. Cl. ..... 119/51.13; 119/56.1

(58) Field of Classification Search ..... 119/51.01, 119/51.02, 51.11, 51.12, 51.13, 51.14, 51.15, 119/52.1, 56.1, 57.1, 57.92; 221/90, 112, 221/114, 123, 124; 222/129, 650
See application file for complete search history.

(56) References Cited

U.S. PATENT DOCUMENTS 3,394,805 A 7/1968 Ross et al.
3,884,189 A * 5/1975 Ruth ..... 119/51.13
4,665,863 A * 5/1987 Toledo ..... 119/51.13
D315,973 S 4/1991 Beaudoin
5,341,914 A 8/1994 DeMars et al.
5,463,980 A 11/1995 Rasmussen
5,520,143 A * 5/1996 Duin ..... 119/51.13
5,740,757 A 4/1998 Smeester
5,899,169 A 5/1999 Jensen
6,200,017 B1 3/2001 van den Berg
6,405,674 B1 6/2002 Majewski
6,520,113 B2 2/2003 van den Berg et al.
6,715,443 B2 * 4/2004 Bernard ..... 119/51.13
6,779,486 B2 8/2004 Vaags

* cited by examiner

*Primary Examiner* — T. Nguyen
(74) *Attorney, Agent, or Firm* — Brett A. Schenck; Walker & Jocke

(57) ABSTRACT

This patent discloses a game feeder. The game feeder may include a container having bins and gates positioned at a bottom of the bins. The bins may include feed. Latches may be attached to the container to retain the gates in a closed position. The latches may be attached to cables. A tripper automatically may pull on a cable at a predetermined interval to move the latch attached to that cable. On moving the latch, the gate being held closed may swing open and the feed within that bin may fall.

16 Claims, 6 Drawing Sheets

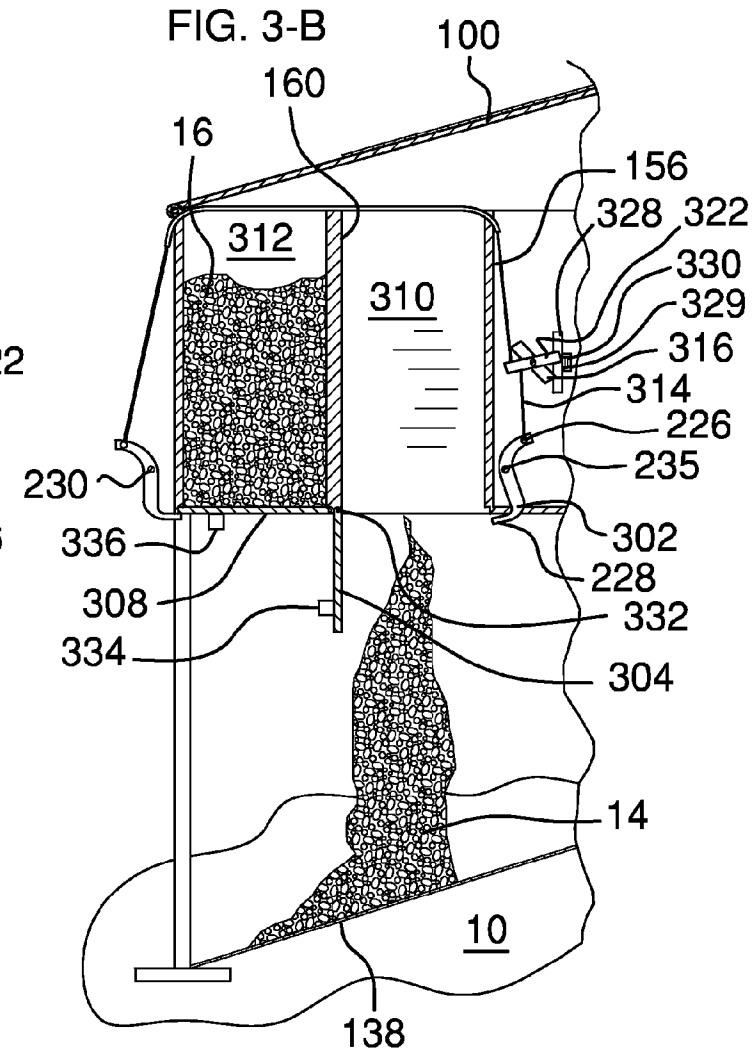
FIG. 3-B
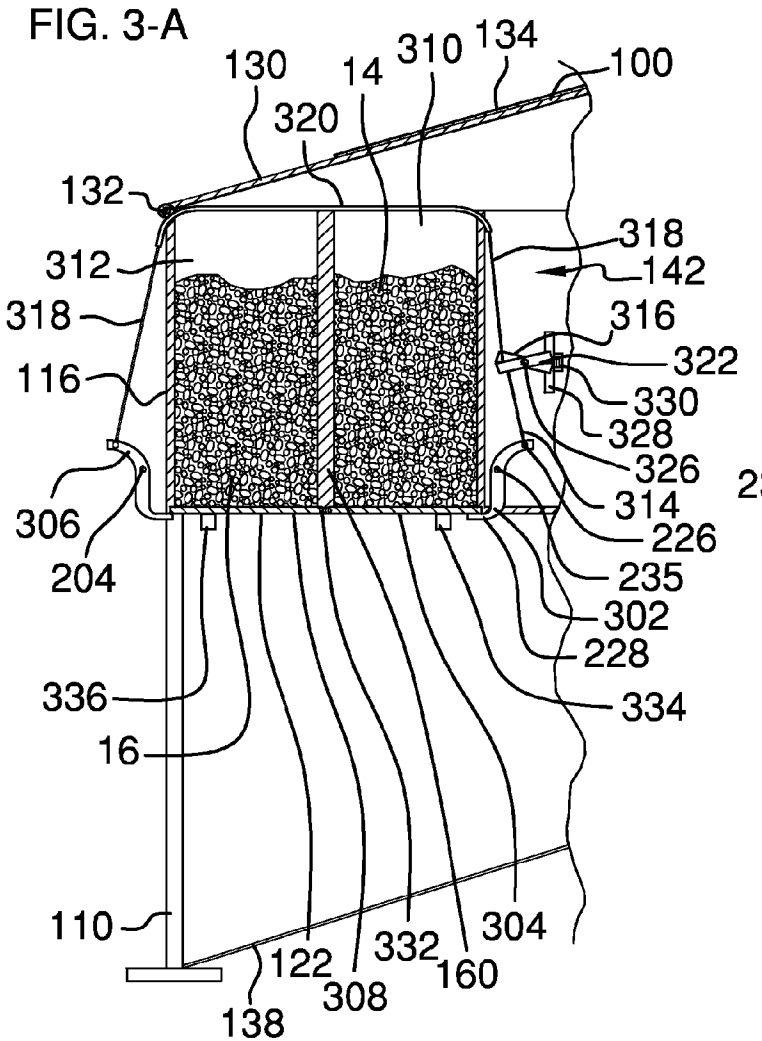
FIG. 3-A

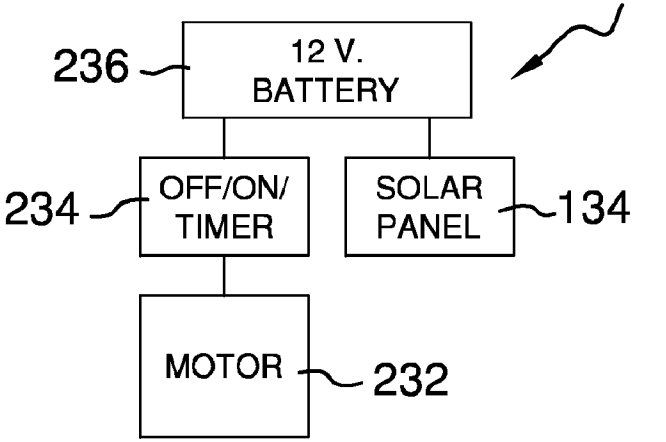
FIG. 4
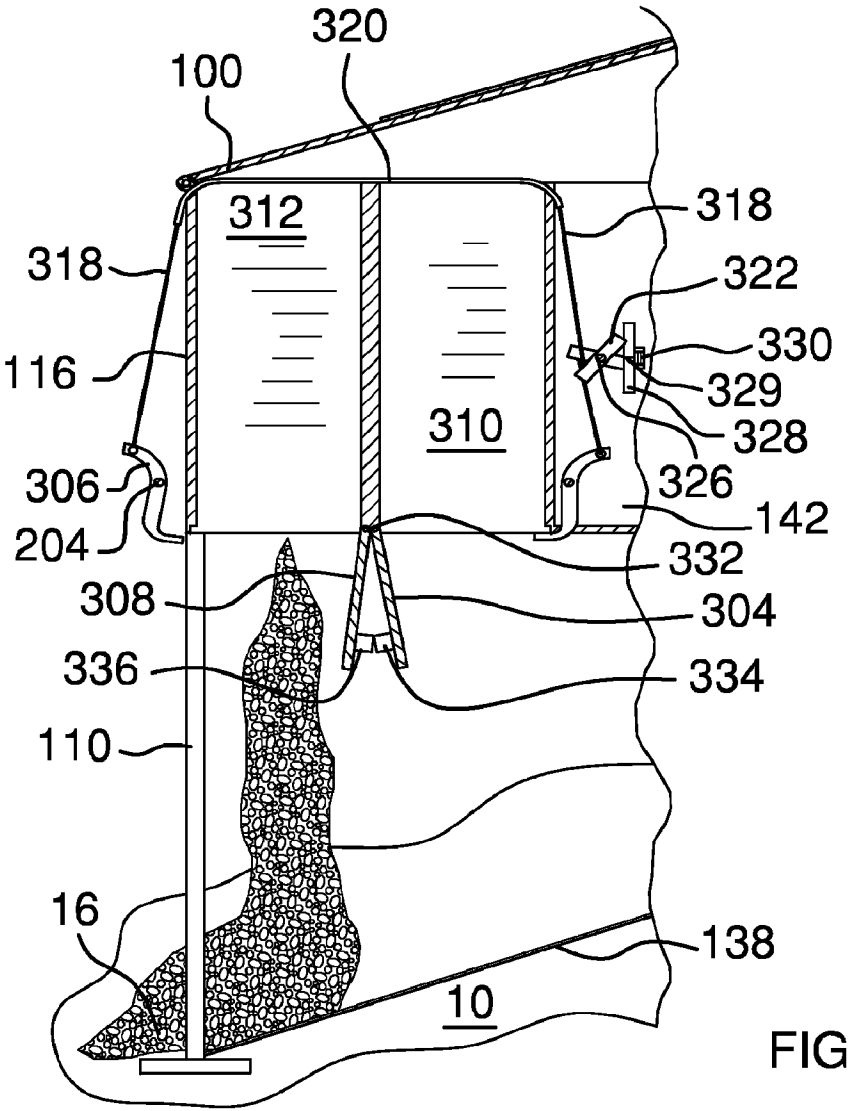
FIG. 3-C

SYSTEM TO FEED ANIMALS

Matter enclosed in heavy brackets [ ] appears in the original patent but forms no part of this reissue specification; matter printed in italics indicates the additions made by reissue.

BACKGROUND

1. Field

The information disclosed in this patent relates to systems to feed animals.

2. Background Information

Deer hunting is a time-honored recreational activity of hunting deer. Hunters pursue numerous types of deer throughout the world, with the white-tailed deer being the most common hunted type in America. Deer hunting has become essential in North America due to the dense population of deer in the eastern United States. This large population yearly results in around 1.5 million vehicle accidents, 130 vehicle-related deaths, and over $1 billion in insurance claims.

To allow for more-bountiful hunting, hunters try to encourage deer to feed in the same general area. Some hunters plant crops solely to attract and keep deer at a particular location to be hunted later. However, these food plots are expensive. In addition, they are inefficient as they attract many kinds of animals, not just those to be hunted.

Game feeders are a more effective method to attract and keep deer at a particular location. Some game feeders are round barrels that sit atop a tripod while others are hung from a tree. Rather than accommodate various types of feed, such as apples, ear corn, and grain, typical game feeders only accommodate grain-style feed, which most deer trample into the ground uneaten. In addition, typical game feeders do not dispense feed automatically over a period of days and thus do not aid a hunter in manipulating and controlling the feeding habits of deer in the area. Further, typical grain feeders do not accommodate large quantities of food, which causes a hunter to return repeatedly to the feeder to fill it.

What is needed is a system to feed animals, including deer and other game, to overcome these and other problems.

SUMMARY

This patent discloses a game feeder. The game feeder may include a container having bins and gates positioned at a bottom of the bins. The bins may include feed. Latches may be attached to the container to retain the gates in a closed position. The latches may be attached to cables. A tripper automatically may pull on a cable at a predetermined interval to move the latch attached to that cable. On moving the latch, the gate being held closed may swing open and the feed within that bin may fall.

BRIEF DESCRIPTION OF THE FIGURES

FIG. 3-A is a section view of feeder 100 taken generally off line 3-3 of FIG. 1 with first rear gate 304 and second rear gate 308 in closed positions.

FIG. 3-B is a view FIG. 3-A advanced in time with first rear gate 304 in an opened position and second rear gate 308 in a closed position.

FIG. 3-C is a view FIG. 3-B advanced in time with first rear gate 304 in an opened position and second rear gate 308 in an opened position.

FIG. 4 is an electrical flow chart 400 of feeder 100.

DETAILED DESCRIPTION

Figure 1:
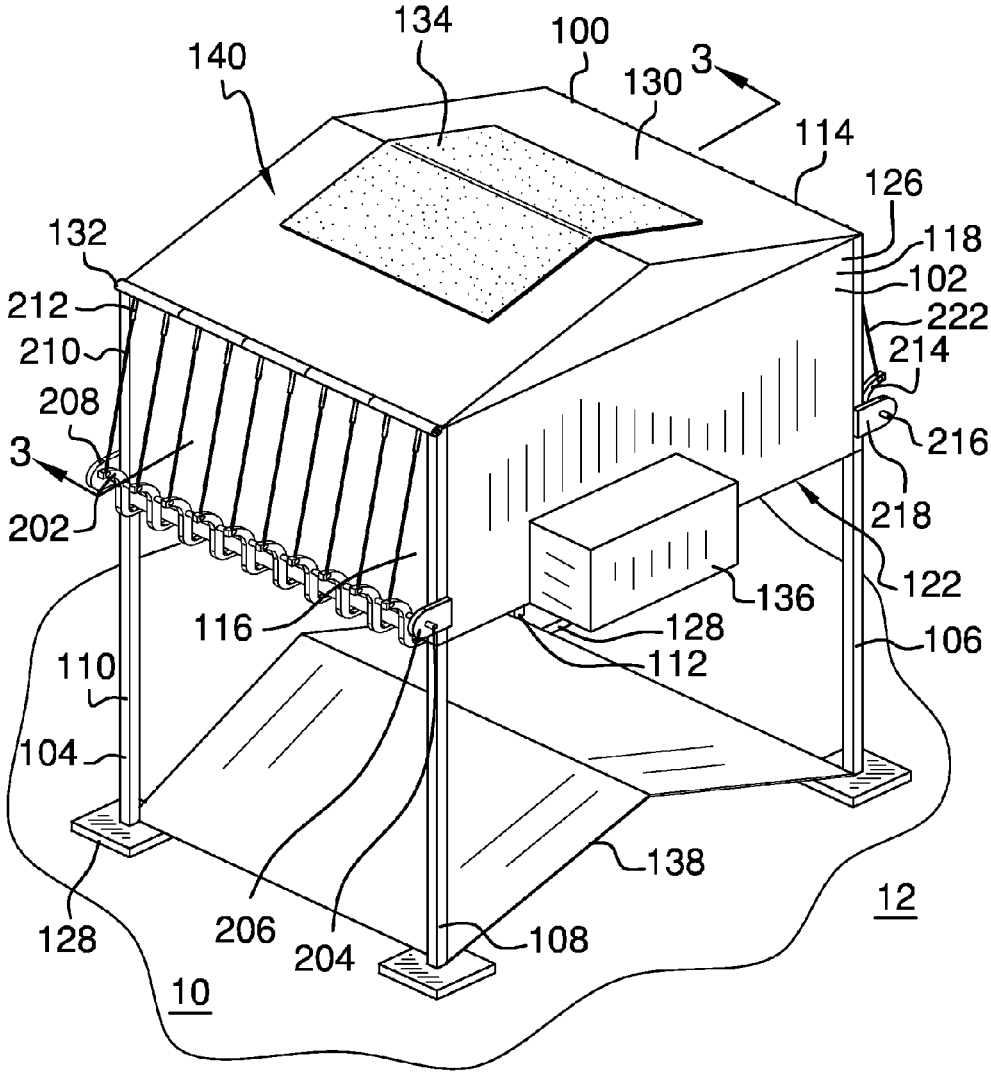
FIG. 1 is an isometric left-rear view of a feeder 100.

FIG. 1 is an isometric left-rear view of a feeder 100. Feeder 100 may be an apparatus to provide a supply of food to animals automatically. In one example, feeder 100 may be part of a system configured to be left in the remote woods by hunters to feed animals automatically, including deer and other game. By feeding deer and other game on a predetermined schedule, the wild animals may be trained to return to the same spot. Here, hunters may find game when returning to that location so that they may more easily acquire the animals.

Typical feeders dispense grain, but grain typically is stamped into the muddy ground by deer. With the grain feed stomped into the ground, the grain feed may not accomplish its purpose, namely, to feed the deer. A feature of feeder 100 is that it may be configured to dispense ear corn, corn attached to a corncob where the corncob is at least four inches long, and two inches in diameter. By being configured to dispense corn attached to a corncob, a user may be assured that the dispensed ear corn feed may feed the deer.

Feeder 100 may include a container 102 that may be supported by legs 104, such as a leg 106, a leg 108, a leg 110, and a leg 112. Legs 104 may be configured to provide support container 102 and to elevate container 102 above a ground 10 within outside 12. Ground 10 may be a surface that may support feeder 100 and outside 12 may be that area around an exterior of feeder 100.

Container 102 may be an object to hold, support, or otherwise position other components of feeder 100. Container 102 may include a container front 114, a container rear 116, a container left side 118 and a container right side 120 positioned substantially parallel to container left side 118, where container left side 118 and container right side 120 may connect container front 114 to container rear 116. A container bottom 122 may connect to each of container front 114, container rear 116, container left side 118, and container right side 120 to form a container interior 124. Container 102 may define a container top 126 positioned near an upper most location around container 102.

Leg 106 may be positioned adjacent to container front 114 and container left side 118. Leg 108 may be positioned adjacent to container left side 118 and container rear 116. Leg 110 may be positioned adjacent container rear 116 and container right side 120. Moreover, leg 112 may be positioned adjacent to container right side 120 and container front 114.

Feet 128 may be attached to legs 104 at a position adjacent to ground 10. Feet 114 may be rectangular shaped slabs having a perimeter that may be much greater than a perimeter of legs 104 to provide stabilizing support to container 102.

Feeder 100 additionally may include a feeder lid 130, a lid hinge 132, a solar panel 134, a motor cover 136, and a feed plate 138. Feeder lid 130 may be a movable cover attached to container rear 116 through lid hinge 132 to close a container opening 133 (FIG. 2) of container 102. Container opening 133 may lead to container interior 124. When closed, feeder lid 130 may reside over all of container top 126 to provide a watertight seal for container 102. The watertight seal may be a foam seal configured to form around container top 126 and any guides that may extend over container top 126.

In one example, feeder lid 130 may be flat. In another example, feeder lid 130 may have a triangular shape profile such as to keep rain from collection on container top 126. Lid hinge 132 may be a flexible, preferably jointed, device that may permit feeder lid 130 to pivot relative to container top 126.

Solar panel 134 may be a sheet or other shaped object that may produce electricity when light shines on it. In one example, solar panel 134 may reside on a feeder lid upper surface 140 of feeder lid 130. Solar panel 134 may be flexible to conform to contours of feeder lid upper surface 140.

Figure 2:
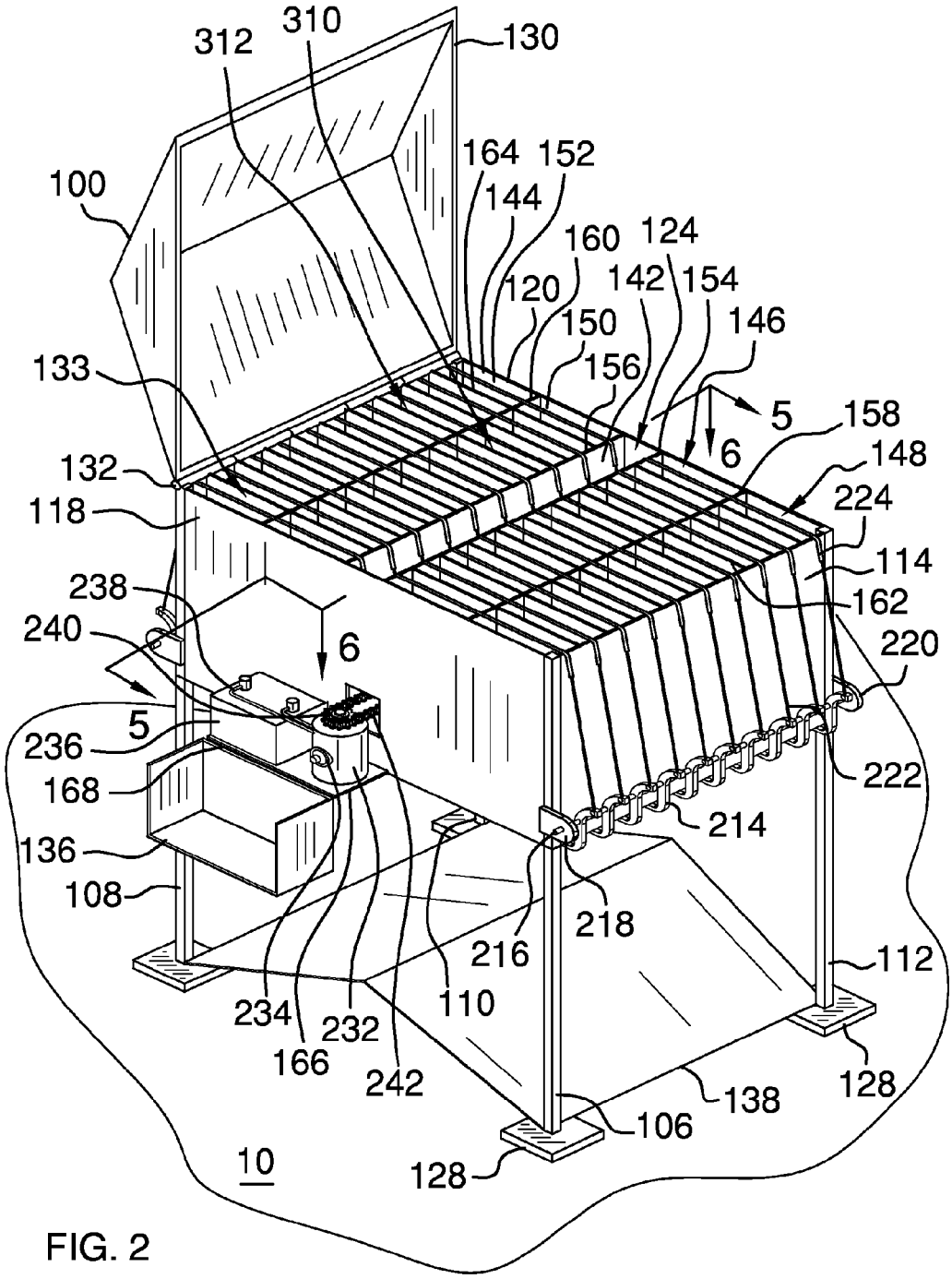
FIG. 2 is an isometric right-front view of feeder 100 with both feeder lid 130 and motor cover 136 in open positions.

Motor cover 136 may be a structure that may be configured to enclose a motor (FIG. 2). In one example, motor cover 136 may be positioned adjacent to container left side 118 near container bottom 122. In another example, motor cover 136 may include a rectangular shape.

Feed plate 138 may be a sheet onto which food material may be dropped by container 102. Feed plate 138 may be configured to assist in moving food from underneath feeder 100 and towards ground 10. In one example, feed plate 138 may be a continuous sheet of material connected to legs 104 beneath container bottom 122, where that sheet may be angled so that food falling on feed plate 138 may be urged away from a midpoint of feeder 100 through leg 106 and leg 112 and through leg 108 and leg 110.

The automatic feeding system of feeder 100 may include a tripper configured to pull a latch away from a gate to cause food to drop from container 102 onto feeder plate 138. The gate may be part of container bottom 122 and may be configured to hold back feed. When the latch is pulled away from the gate, the feed may fall from container interior 124 onto feeder plate 138, where deer and other game may eat it.

A chain may move the tripper and a battery-powered motor may drive the chain. The motor may have a timer that may permit a user to control the chain's movements. Using the motor controls, a user may set the chain to move 1½ inches in intervals of one, two, or three times within a twenty-four hour period. For a container 102 measuring approximately twenty inches tall, forty-four inches long, and thirty to thirty five inches wide, such slow chain movement may spread out automatic feeding from feeder 100 over a few weeks. This may be sufficient time to teach deer and other game to return to feeder 100 each day for feeding.

As in FIG. 1, feeder 100 additionally may include rear exterior latches 202, a rear exterior rod 204, a first rear bracket 206, a second rear bracket 208, rear exterior cables 210, and rear guides 212. In addition, feeder 100 may include front exterior latches 214, a front exterior rod 216, a first front bracket 218, a second front bracket 220 (FIG. 2), front exterior cables 222, and front guides 224 (FIG. 2).

First rear bracket 206 may be attached to leg 108 near container bottom 122 and second rear bracket 208 may be attached to leg 110 near container bottom 122 such that rear exterior rod 204 may be held between first rear bracket 206 and second rear bracket 208 in a position that substantially may be parallel to lid hinge 132. Rear exterior latches 202 may be pivotally attached to rear exterior rod 204. Rear exterior cables 210 may be attached to rear exterior latches 202 and rear guides 212 may be positioned about rear exterior cables 210.

Each rear exterior latch 202 may be a fastener configured to join a gate (such as a second rear gate 308 of FIG. 3-A) to container bottom 122 while allowing for eventual separation of part of the gate from container bottom 122. Rear exterior latch 202 may have an S-shape, where a latch cable end 226 (FIG. 3-A) may be configured to attach to a cable to receive input effort and where a latch hook end 228 (FIG. 3-A) may be configured to receive the output load and to join a gate with container bottom 122 for eventual separation. Rear exterior latch 202 may include a latch hole 230 (FIG. 3-B) configured to receive rear exterior rod 204. Other latches within feeder 100 may be similar to rear exterior latch 202, but have different positional designations, such as rear exterior for those latches located in outside 12 near container rear 116. In general, other items within feeder 100 having similar names may function similarly and have similar structure, but have different positional designations.

Rear exterior rod 204 may be a long thin implement made of metal, plastic, or wood. Rear exterior rod 204 may be secured by first rear bracket 206 and second rear bracket 208 and may be passed through latch holes 230 to act as a fulcrum around which rear exterior latches 202 may rotate. With rear exterior rod 204 so positioned, rear exterior latches 202 and rear exterior rod 204 may be thought of as a first-class lever where the fulcrum is located in between the input effort and the output load.

First rear bracket 206 and second rear bracket 208 each may be a structural support that may project from a leg 104 on which to fasten rear exterior rod 204. Each bracket 206, 208 may have an L-shape and holes. Rear exterior rod 204 may pass through the holes of bracket 206, 208.

Rear exterior cables 210 may be a strong rope made of hemp or steel wire. The hemp or steel wire may be twisted. An end of each rear exterior cables 210 may be attached to a latch cable end 226. Rear exterior cables 210 may pass through rear guides 212. Rear guides 212 may be protective jackets or sheaths positioned about rear exterior cables 210 to permit smooth, uninterrupted movement of rear exterior cables 210. In one example, rear guides 212 may be physically connected to container 102.

The front latches and cables may have an arrangement similar to rear exterior latch 202 and rear exterior cables 210. FIG. 2 provides more details.

FIG. 2 is an isometric right-front view of feeder 100 with both feeder lid 130 and motor cover 136 in open positions. First front bracket 218 may be attached to leg 106 near container bottom 122 and second front bracket 220 may be attached to leg 112 near container bottom 122 such that front exterior rod 216 may be held between first front bracket 218 and second front bracket 220 in a position that substantially may be parallel to lid hinge 132. Front exterior latches 214 may be those latches located within outside 12 near container front 114. Front exterior latches 214 may be pivotally attached to front exterior rod 216. Front exterior cables 222 may be attached to front exterior latches 214 and front guides 224 may be positioned about front exterior cables 222.

Container 102 may be divided into a well 142 and bins 144. Well 142 substantially may be positioned parallel to lid hinge 132 and substantially positioned centrally within container interior 124 to separate bins 144 into two approximately volumes. Bins 144 may include a first front bin 146, a second front bin 148, a first rear bin 150, and a second rear bin 152. Well 142 may be positioned between first front bin 146 and first rear bin 150. Second front bin 148 may be positioned adjacent to first front bin 146 and second rear bin 152 may be positioned adjacent to first rear bin 150.

A first well partition 154 may face a second well partition 156 to form an area there between that may define well 142. Both first well partition 154 and second well partition 156 may extend between container left side 118 and container right side 120 and extend from container top 126 down to container bottom 122.

Bins 144 may be divided by a front partition 158 and a rear partition 160, each of which may extend between container left side 118 and container right side 120 and extend from container top 126 down to container bottom 122. Front partition 158 may divide bins 144 into first front bin 146 and second front bin 148 and rear partition 160 may divide bins in to first rear bin 150 and second read bin 152. In one example, container front 114, front partition 158, first well partition 154, second well partition 156, rear partition 160, and container rear 116 substantially may be parallel to each other. Each partition may be a vertical structure that may divide container interior 124.

Well 142 may include a hollow volume into which rear exterior cables 210 and front exterior cables 222 may pass. Additional components of feeder 100, such as those shown in FIG. 5 and FIG. 6, may reside within well 142. In this regard, well 142 may retain a significant portion of the mechanism for pulling on rear exterior cables 210 and front exterior cables 222.

Each bin 144 may include a hollow volume configured to hold feed. In one example, each bin 144 approximately may hold 3.5 cubic feet of feed. When filled, container 102 may hold fourteen cubic feet of feed, in one example.

Bins 144 additional may be segregated by front dividers 162 and read dividers 164. Front dividers 162 and read dividers 164 may be vertical structures that may further subdivide container interior 124. Front dividers 162 may extend from container front 114, through front partition 158, to first well partition 154. Additionally, front dividers 162 may extend from container top 126 down to container bottom 122. Rear dividers 164 may extend from second well partition 156, through rear partition 160, to container rear 116. Additionally, rear dividers 164 may extend from container top 126 down to container bottom 122. In one example, there may be nine front dividers 162 and nine read dividers 164, each substantially equally spaced within bins 144. In this example, there may be forty bins 144, each of which may hold one, twenty-four hour supply of food.

Front exterior cables 222 and front guides 224 may extend over container front 114, front partition 158, and first well partition 154. Front guides 224 may be positioned between front exterior cables 222 and container front 114, front partition 158, and first well partition 154. This arrangement may permit front exterior cables 222 to move relative to container front 114, front partition 158, and first well partition 154 without interference from container front 114, front partition 158, and/or first well partition 154.

Rear exterior cables 210 and rear guides 212 may extend over container rear 116, rear partition 160, and second well partition 156. Rear guides 212 may be positioned between rear exterior cables 210 and container rear 116, rear partition 160, and second well partition 156. This arrangement may permit rear exterior cables 210 to move relative to container rear 116, rear partition 160, and second well partition 156 without interference from container rear 116, rear partition 160, and/or second well partition 156.

In addition to motor cover 136, feeder 100 additionally may include a motor platform 166, a motor cover hinge 168, a motor 232, motor controls 234, a battery 236, battery cables 238, a drive gear 240, and a drive chain 242. Motor cover hinge 168 may attach motor cover 136 to motor platform 166. Motor platform 166 may be attached to container left side 118 near container bottom 122. Motor 232 may reside on motor platform 166 next to battery 236, where battery cables 238 may connect battery 236 to motor 232. Battery 236 additionally may be connected to solar panel 134. Motor controls 234 may be attached to motor 232. Drive gear 240 may be attached to motor 232 and drive chain 242 may be attached to drive gear 240.

Motor platform 166 may be a horizontal surface elevated from ground 10 and configured to support and bear the weight of motor 232 and battery 236. Motor cover hinge 168 may be a flexible, preferably jointed, device that may permit motor cover 136 to pivot relative to motor platform 166. Motor cover hinge 168 may attach motor cover 136 to motor platform 166 such that, when motor cover 136 is closed, motor platform 166 and container left side 118 complete motor cover 136 as an enclosure.

Motor 232 may be a device to convert electrical power into mechanical rotary mechanical force and motion. Motor 232 may be a 6- or 12-volt, slow-gear motor that may be powered by photoelectric/solar panels 134 and a rechargeable solar battery 236. Motor controls 234 may be knobs, button, dials, and other apparatus and mechanisms through which a user may control and manipulate the input and/or output of motor 232. By controlling motor 232, a user may control the speed at which drive chain 242 may move and, in turn, control the amount and timing of feed released from container 102 onto feeder plate 138.

Battery 236 may be a device that may produce electricity, such as by converting stored chemical energy into electrical energy. Battery 236 may be rechargeable through power received from solar panel 134 and/or from a power outlet (not shown). Battery cables 238 may be heavy gauge insulated wires with clips and other fasteners on each end.

Drive gear 240 may be a toothed wheel configured to engage drive chain 242 and transmit rotational force to drive chain 242. Drive chain 242 may be a series of links fitted into one another to make a flexible ligament. Drive chain 242 may receive rotational force from drive gear 240.

In general, feeder 100 may include multiple gates that may be opened independently. For example, a rear well latch 302 (FIG. 3-A) may hold close a first rear gate 304 and a rear exterior latch 306 may hold close a second rear gate 308. Rear well latch 302 may be a latch located within well 142 near second wall partition 156. Springs (not shown) may bias rear well latch 302 and rear exterior latch 306 against first rear gate 304 and second rear gate 308, respectively.

Feeder 100 may include first feed 14 in a first rear bin 310 and second feed 16 in a second rear bin 312. When closed, first rear gate 304 may retain first feed 14 within first rear bin 310. Moreover, when closed, second rear gate 308 may retain second feed 16 within second rear bin 312. Where there are forty bins 144, feeder 100 may include forty gates.

FIG. 3-A is a section view of feeder 100 taken generally off line 3-3 of FIG. 1 with first rear gate 304 and second rear gate 308 in closed positions. A rear well cable 314 may connect from rear well latch 302 to a first rear trip dog 316. A rear exterior cable 318 may connect from rear well latch 306 through a rear guide 320 to a second rear trip dog 322. First rear trip dog 316 and second rear trip dog 322 may be positioned on a rear trip rod 326 to engage a tripper 328 in that order.

Tripper 328 may be a triangular-shaped component attached to a trip chain 330 and having a tripper lead end 329 as a point where useful work may be applied. The triangle shape may permit tripper 328 to be aligned when moved forward, even if trip chain 330 begins to sag. In one example, tripper 328 may include a pair of one-inch ears or tabs that may be welded to one link trip chain 330. One of the tabs may extend upward, while the other may extend downward.

Motor 232 may move trip chain 330. Rear well latches 302 may be positioned on a rear well rod 235. First rear gate 304 and second rear gate 308 may be attached below rear partition 160 to container bottom 122 through a rear gate hinge 332. First rear gate 304 may include a first rear gate magnet 334 and second rear gate 308 may include a second rear gate magnet 336.

Rear well latch 302 may be a latch similar to the latches of rear exterior latches 202. First rear gate 304 and second rear gate 308 each may be moveable barriers configured to support the weight of feed 14 and feed 16, respectively. When closed, first rear gate 304 and second rear gate 308 may be substantially parallel to container bottom 122. When opened, first rear gate 304 and second rear gate 308 may be substantially perpendicular to container bottom 122.

Feed 14 and feed 16 may be food for animals. First rear bin 310 and second rear bin 312 may be part of first rear bins 150 and second rear bins 152, respectively. First rear trip dog 316 and second rear trip dog 322 may be first class levers that may fulcrum about rear trip rod 326 on receiving an input effort from tripper 328 to produce an output tug for associated cables. Tripper 328 may be an angled wedge positioned to push down on first rear trip dog 316 and push up on second rear trip dog 318. Trip chain 330 may be a series of links fitted into one another to make a flexible ligament. Rear gate hinge 332 may be a flexible, preferably jointed, device that may permit both first rear gate 304 and second rear gate 308 to pivot relative to container bottom 122 near rear partition 160. First rear gate magnet 334 and second rear gate magnet 336 each may include material that may produce a magnetic field around itself such that second rear gate magnet 336 may be positioned and configured to repel first rear gate magnet 334 to keep second rear gate 308 from banging into first rear gate 304.

FIG. 3-B is a view FIG. 3-A advanced in time with first rear gate 304 in an opened position and second rear gate 308 in a closed position. Its operation may be as follows. As trip chain 330 advances tripper 328 forward, a tripper lead end 329 of tripper 328 may engage first rear trip dog 316 to force down a first end of first rear trip dog 316. In response, first rear trip dog 316 may fulcrum about rear trip rod 326 to raise a second end of first rear trip dog 316. Raising the second end of first rear trip dog 316 may cause rear well cable 314 to be pulled upward. Pulling rear well cable 314 upward may cause latch cable end 226 to rise upwards. This, in turn, may cause rear well latch 302 to fulcrum about rear well rod 235 to move latch hook end 228 away from first rear gate 304. Without the support provided by rear well latch 302, first rear gate 304 may pivot about rear gate hinge 332 to cause feed 14 to fall from first rear bin 310 onto feeder plate 138. With feeder plate 138 angled, feed 14 may continue towards ground 10.

FIG. 3-C is a view FIG. 3-B advanced in time with first rear gate 304 in an opened position and second rear gate 308 in an opened position. Its operation may be as follows. As trip chain 330 continues to advanced tripper 328, tripper lead end 329 may engage second rear trip dog 322 to force upward a first end of second rear trip dog 322. In response, second rear trip dog 322 may fulcrum about rear trip rod 326 to lower a second end of second rear trip dog 322. Lowering the second end of second rear trip dog 322 may cause rear exterior cable 318 to be pulled downward within well 142. Pulling rear exterior cable 318 downward within well 142 may cause rear exterior cable 318 to rise relative to container rear 116. Raising rear exterior cable 318 may cause rear exterior latch 306 to fulcrum about rear exterior rod 204 to move rear exterior latch 306 away from second rear gate 308. Without the support provided by rear exterior latch 306, second rear gate 308 may pivot about rear gate hinge 332 to cause feed 16 to fall from second rear bin 312 onto feeder plate 138. With feeder plate 138 angled, feed 16 may continue towards ground 10.

To minimize the scaring of deer and other game, it may be desirable to minimize noise emanating from feeder 100. Thus, second rear gate magnet 336 may be positioned on second rear gate 308 to repel first rear gate magnet 334, which may be positioned on first rear gate 304. As second rear gate 308 swings downward, second rear gate magnet 336 may approach first rear gate magnet 334. Since magnet 334 and magnet 336 may be arranged to repel each other, their approach to one another may cause second rear gate 308 to repel first rear gate 304 without actually contacting first rear gate 304. Since second rear gate 308 and first rear gate 304 may be prevented from contacting each other as they pivot about rear gate hinge 332, noise emanating from feeder 100 may be minimized The other components of feeder 100, including motor 232 and its chains, may have features that minimize sounds emanating from those components when in operation.

FIG. 4 is an electrical flow chart 400 of feeder 100. Battery 236 may be connected to both motor controls 234 and solar panel 134. Moreover, motor controls 234 may be connected to motor 232.

Figure 5:
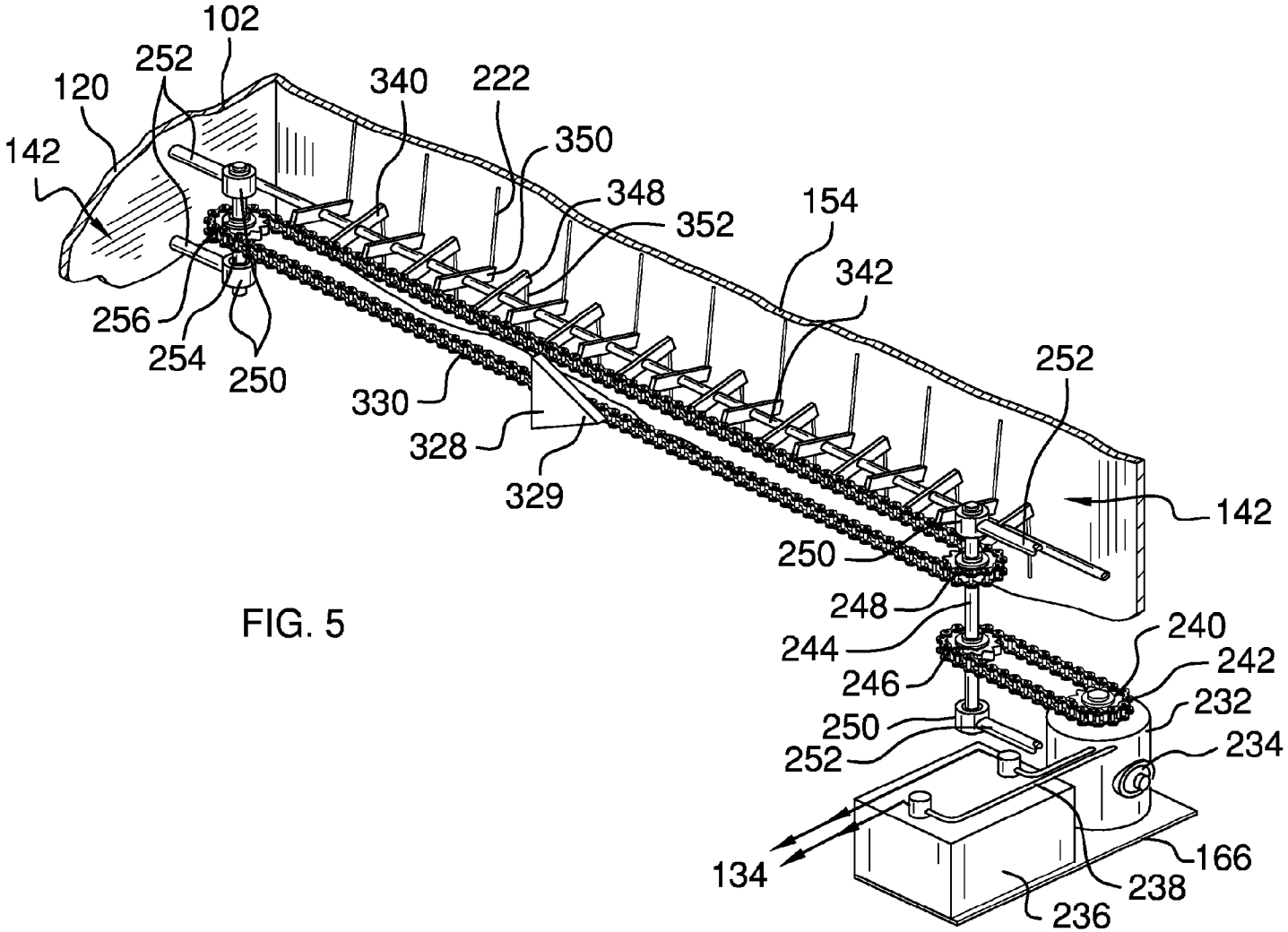
FIG. 5 is an isometric section view of feeder 100 taken off line 5-5 of FIG. 2 with details removed for clarity.
Figure 6:
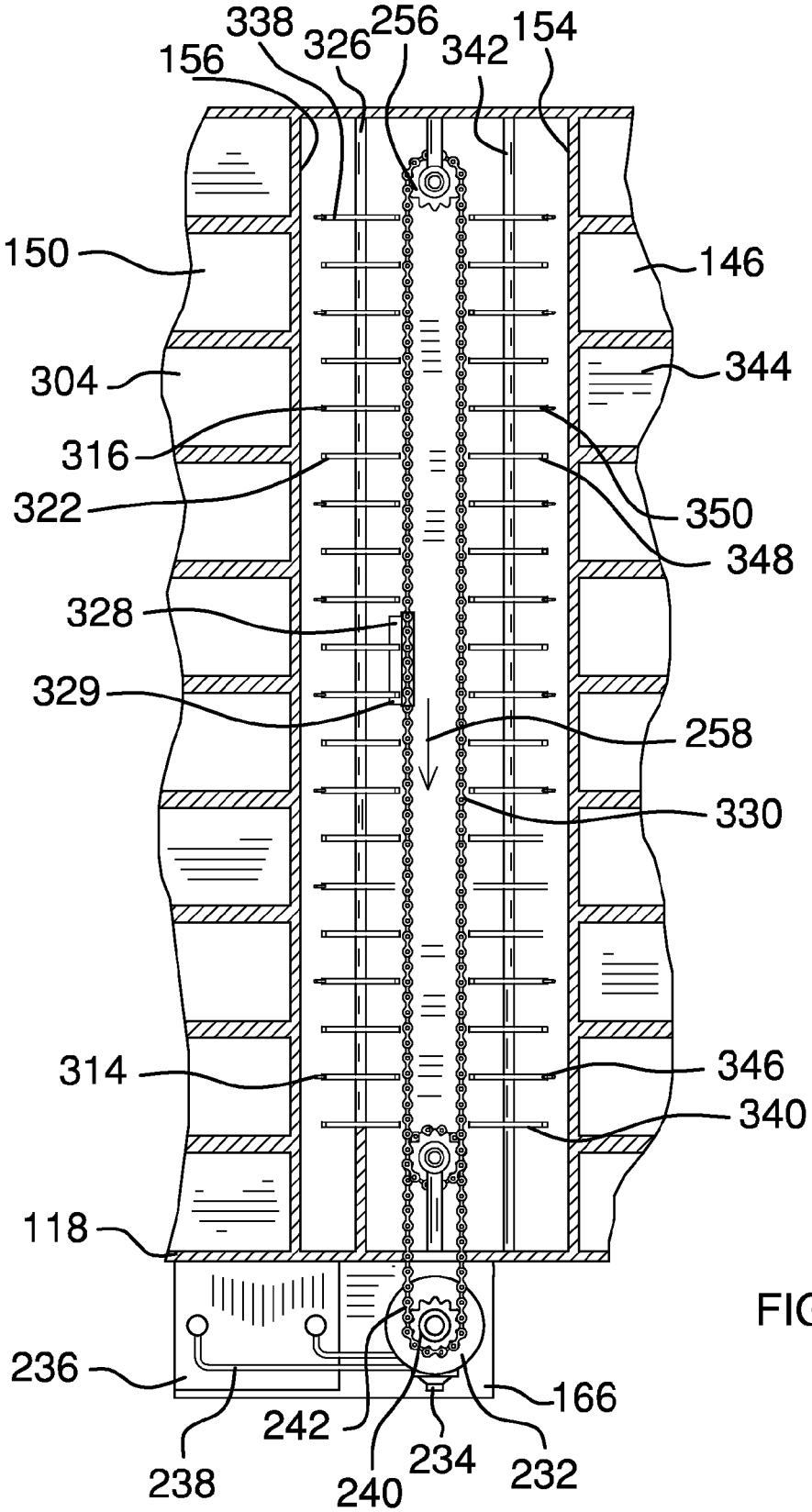
FIG. 6 is a top section view of feeder 100 taken off line 6-6 of FIG. 2 with details removed for clarity.

FIG. 5 is an isometric section view of feeder 100 taken off line 5-5 of FIG. 2 with details removed for clarity. FIG. 6 is a top section view of feeder 100 taken off line 6-6 of FIG. 2 with details removed for clarity. Feeder 100 additionally may include a drive shaft 244, a first drive shaft gear 246, a second drive shaft gear 248, bearings 250, mounts 252, a follower shaft 254, and a follower shaft gear 256.

First drive shaft gear 246 may be connect to and driven by drive chain 242. Drive shaft 244 may be connected to first drive shaft gear 246 and second drive shaft gear 248 to form a double sprocket. Bearings 250 may be connected about drive shaft 244 and mounts 252 may connect bearings 250 to container 102. Follower shaft gear 256 may be connected to second drive shaft gear 248 through trip chain 330. Follower shaft gear 256 also may be connected to and supported by follower shaft 254. Bearings 250 may be connected about follower shaft 254 and mounts 252 may connect bearings 250 to container 102.

Drive shaft 244 may be an elongated cylindrical component configured to transfer power from first drive shaft gear 246 to second drive shaft gear 248. First drive shaft gear 246 and second drive shaft gear 248 each may be a toothed wheel configured to engage drive chain 242 and trip chain 330, respectively, to transmit force and movement from drive chain 242 to trip chain 330. Each bearing 250 may be a rotating support positioned between a shaft configured to move (drive shaft 244 and follower shaft 254) and a mount 252 to allow the shaft to move more easily. Follower shaft 254 may be an elongated cylindrical component configured to support follower shaft gear 256. Follower shaft gear 256 may be a toothed wheel configured to engage trip chain 330 to permit trip chain 330 to rotate tripper 328 in a direction of arrow 258 (FIG. 6).

Rear trip rod 326 may be a long thin implement made of metal, plastic, or wood. Rear trip rod 326 may be configured to remain stationary as rear trip dogs 338 (FIG. 6) rotate relative to rear trip rod 326. In addition to rear trip rod 326, feeder 100 may include rear trip dogs 338 (FIG. 6), front trip dogs 340 (FIG. 5 and FIG. 6), and a front trip rod 342.

Rear trip dogs 338 (FIG. 6) may include one trip dog for each rear gate, such as first rear gate 304 (FIG. 3-A) and second rear gate 308. Rear trip dogs 338 may be first class levers that may fulcrum about rear trip rod 326 on receiving an input effort from tripper 328 to produce an output tug for associated cables, such as rear well cables 314 and rear exterior cables 318. First rear trip dog 316 (FIG. 3-A) and second rear trip dog 322 may be part of rear trip dogs 338.

Front trip dogs 340 may include one trip dog for each front gate, such as a first front gate 344. Front trip dogs 340 may be first class levers that may fulcrum about front trip rod 342 on receiving an input effort from tripper 328 to produce an output tug for associated cables, such as front well cables 346 and front exterior cables 222. A first front trip dog 348 (FIG. 5 and FIG. 6) and a second front trip dog 350 may be part of front trip dogs 340. Front exterior cable 222 may be attached to second front trip dog 350 and a front well cable 352 may be attached to first front trip dog 348.

Rear trip dogs 338 and front trip dogs 340 each may have first trip dogs interleaved with second trip dogs so that one first trip dog may be positioned between two second trip dogs and one second trip dog may be positioned between two first trip dogs. In this way, tripper 328 may alternate between engaging first trip dogs and second trip dogs. This may permit a second front bin 148 to open immediately after an adjacent first front bin 146 and an unopened first front bin 146 to open immediately after the just opened second front bin 148.

Front trip rod 342 may be a long thin implement made of metal, plastic, or wood. Front trip rod 342 may be configured to remain stationary as front trip dogs 340 rotate relative to front trip rod 342. First front gate 344 may have features and structure similar to first rear gate 304 and front well cables 346 may have features and structure similar to rear well cables 314. First front trip dog 348 and second front trip dog 350 may have features and structure similar to first rear trip dog 316 (FIG. 3-A) and to second rear trip dog 322, respectively. Front well cable 352 may be part of front well cables 346 and may be attached between first front gate 344 and front trip dog 348.

The feeder may be a type of game feeder for hunters. The feeder may not only allow a hunter to dispense various types of feed, such as apples, ear corn, and grain, but the feeder may dispense feed automatically over a period of days. This may encourage animals such as deer to feed in the same general area. In turn, this may allow for hunting that is more bountiful.

The feeder may be made of metal and include a large container that may measure approximately twenty inches tall, forty-four inches long, and thirty to thirty-five inches wide. The shape may be upright square. The container may stand on a series of four corner legs, each of which may measure approximately thirty-six inches tall and may feature a flat base assembly. The legs may be metal, the bins may be plastic, the tripping latches may be aluminum, and the chains may have steel sprockets. In another example, the legs and feed plate may be omitted and the feeder may be hung from a tree, for example.

The container may include a watertight lid assembly and may feature a series of between thirty-two and forty small compartment bins within its interior. Each bin may measure approximately twenty inches long, three inches wide, and twenty-four inches tall and may accommodate different types of feed, such as small apples, ear corn, and grain. The bins may be arranged in pairs of rows, with eight to ten bins in each row, while each bin may include a tight, spring-loaded gate on its underside. This gate may be engaged or released via a trip cable and latch assembly.

The latches holding the gate closed may be spring loaded with a torsion spring to permit the gates to be slammed closed easily. In other words, an open gate may be pushed past a latch that may be spring biased in a closed position so that the gate may be closed and the latch returned to the closed position automatically by the spring. As an example, a spring may be positioned between latch cable end 226 and rear partition 160 in FIG. 3-B. This may spring bias rear well latch 302 in a closed position during those times when the force of tripper 328 does not overcome the spring.

The feeder also may include a 6- or 12-volt, slow-gear motor that may be powered by photoelectric/solar panels and a rechargeable solar battery. The motor may engage with a roller and chain assembly, which may run between the rows of bins. A pair of 1-inch ears or tabs may be welded to one link in the chain assembly. One of the tabs may extend upward, while the other may extend downward. A timer may be incorporated into the motor to instruct the motor to move the chain 1½ inches in intervals of one, two, or three times within a twenty-four hour period. When the tripper tab on the chain moves across the latch assembly associated with a particular bin, the latch assembly may pull the relevant cable and release the gate on the underside of the corresponding bin. This may release all the feed material from within that bin. The feed may fall onto a pyramidal shield affixed to the legs of the feeder. The pyramidal shield may further urge the feed towards the ground surrounding the feeder. The tripper may trip one gate at a time or may be configured to trip a front gate and adjacent rear gate at the same time. The feeder may be configured with single rows of bins.

In operation, a hunger may transport the feeder to a remote outdoor location where the hunter desires to attract game. The hunter may then fill the feeder's individual bins with different types of feed, specifically apples, ear corn, and grain. The feeder lid may be closed on top of the bins and the timer mechanism set to control the feeder's motor with predetermined movements. The hunter then may leave the area.

As time passes, the motor may move the trip chain and tripper slowly so that the tripper only engages with the latches once, twice, or three times daily. When the tripper engages a trip dog associated with a bin's gate, the tripper may pull the cable to move the latch to release the gate downward. This may release the feed retained within the bin by the gate. The feed may fall onto the feed plate and be dispersed around the base of the feeder.

Once all the bins of the feeder are emptied, a hunter may close all the latch gates on the underside of the feeder. The feeder lid may be opened and the bins refill with the desired types of feed. The hunter then may reset the timer and motor and again leave the area.

Since the bins the feeder may be configured to accommodate different types of feed materials, such as apples and ear corn and grain, the bins may provide hunters with more options to attract deer to a hunting spot. This may eliminate a need to use feeders that only accommodate grain-style feed and may thus provide a more effective means of baiting deer. The chain and motor of the feeder also may move very slowly and may thus empty only one or three to six feed bins throughout the course of a day. This may allow hunters to dispense a variety of feed material over a period of several days, or possibly a week. In turn, this may encourage deer to continue feeding at the same spot. Thus, feeder may help ensure plentiful game in the hunting area, which may result in more kills.

The feeder may fulfill a need for a more versatile and practical feeder. Appealing features of the feeder may include its ease of use, automatic design, convenience, time- and effort-savings, and ability to dispense more than one type of game feed. The multiple bins of the feeder may allow hunters to not only dispense typical grain feed at a hunting spot, but ear corn and apples as well. Since the feeder may accommodate larger types of feed, the feeder may eliminate a need to use only small, grain-style feed, which often is trampled into the ground by deer and other animals. Not only may this ensure animals may smell and access bait food, but it may save a hunter money, as less feed or food may be stomped into the ground and thus less feed may be wasted.

The mechanics of the feeder may allow a hunter to dispense automatically a variety of feed at a hunting area over a period of days. Thus, the feeder may allow the hunter to manipulate and control the feeding habits of deer in the area. Since the animals may be conditioned to return to the feeder day after day, game may become plentiful in the area. In turn, this may increase the hunter's chances of making successful kills, which may result in more productive and thus more enjoyable hunting trips.

Since the feeder may dispense feed over a period of days, the feeder may eliminate a need for a hunter to return to the feeder and fill its bins with feed. Not only may this save time and effort, but it may also enhance comfort, particularly during periods of cold weather. Rechargeable batteries may power the feeder's motor and chain assembly. Solar or photovoltaic panels may charge the batteries. This may eliminate the hassles associated with recharging removable batteries or having to deal with external power supplies. The feeder may be easy to use, convenient, practical, time- and effort-saving, efficient, and durable for years of effective, low-maintenance use.

The information disclosed herein is provided merely to illustrate principles and should not be construed as limiting the scope of the subject matter of the terms of the claims. The written specification and figures are, accordingly, to be regarded in an illustrative rather than a restrictive sense. Moreover, the principles disclosed may be applied to achieve the advantages described herein and to achieve other advantages or to satisfy other objectives, as well.

What is claimed is:

1. A game feeder, comprising:

a container having a container interior divided into a well positioned between first front bins and first rear bins, where the container includes a container bottom and where each bin includes a gate connected to the container bottom through a hinge such that the gate seals a bottom of the bin when closed and unseals the bottom of the bin when the gate is rotated about the hinge to a position that is remote from the container bottom;

latches attached to the container within the well, where there is one latch for each gate, where each latch is configured to retain the gate in a closed position and configured to rotate away from the gate to permit the gate to open;

cables attached to each latch within the well;

trip dogs attached to each cable within the well; and a tripper positioned within the well, where the tripper is configured to move automatically past each bin to engage each trip dog such that, on engaging a trip dog associated with a bin, the tripper causes that trip dog to pull on the cable connected to that trip dog, where pulling on that cable causes the latch connected to that cable to move far enough away from the gates so that a previously closed gate associated with that bin opens.

2. The game feeder of claim 1, where the container interior further is divided into second front bins and second rear bins, where the first front bins are positioned between the well and the second front bins and the first rear bins are positioned between the well and the second rear bins, where the latches are interior latches, where the cables are well cables, and where the trip dogs are first trip dogs, where the game feeder further comprises:

exterior latches attached to the container at a position that is outside of the container, where there is one well latch for each first front bin gate and each first rear bin gate, where there is one exterior latch for each second front bin gate and each second rear bin gate, where the latches include front well latches associated with the gates of the first front bins, rear well latches associated with the first rear bins, front exterior latches associated with the gates of the second front bins, and rear exterior latches associated with the gates of the second rear bins;

second trip dogs positioned with the well to interleave with the first trip dogs; and exterior cables, where the well cables are positioned within the well and attached between the first trip dogs and the well latches, and where the exterior cables are connected between the exterior latches and the second trip dogs, where the tripper is configured to move automatically past each bin to alternate between engaging a first trip dog and a second trip dog.

3. The game feeder of claim 2, where each bin is large enough to hold and dispense through the bin bottom corn attached to a corncob, where the corncob is at least four inches long and two inches in diameter.

4. The game feeder of claim 1, further comprising:

legs attached to the container; and a feeder plate positioned below the container bottom and attached to the legs.

5. The game feeder of claim 4, where the feeder plate is angled to urge feed located on *the* feeder plate towards the ground.

6. The game feeder of claim 5, further comprising:

a feeder lid connected to the container;

a solar panel attached to a top of the feeder lid;

a battery attached to the solar panel;

a motor attached to the battery; and motor controls attached to the motor, where the motor controls are configured to control the speed at which the motor operates.

7. The game feeder of claim 6, where the tripper is triangular shape and include a tripper lead end, where the feeder further comprises:

a drive gear attached to the motor at a location that is outside of the well;

a drive chain attached to the drive gear;

a first drive shaft gear attached to the drive chain, where the first drive shaft gear is positioned within the well;

a second drive shaft gear positioned in mechanical communication with the first drive shaft gear; and a trip chain positioned within the well and attached to the second drive shaft gear, where the tripper is attached to the trip chain.

[8. A game feeder, comprising:

a container having a container interior divided into a well positioned between first front bins and first rear bins, where the container includes a container bottom and where each bin includes a gate connected to the container bottom through a hinge such that the gate seals a bottom of the bin when closed and unseals the bottom of the bin when the gate is rotated about the hinge to a position that is remote from the container bottom;

latches attached to the container within the well, where there is one latch for each gate, where each latch is configured to retain the gate in a closed position and configured to rotate away from the gate to permit the gate to open;

cables attached to each latch within the well;

trip dogs attached to each cable within the well;

a tripper positioned within the well, where the tripper is configured to move automatically past each bin to engage each trip dog such that, on engaging a trip dog associated with a bin, the tripper causes that trip dog to pull on the cable connected to that trip dog, where pulling on that cable causes the latch connected to that cable to move far enough away from the gates so that a previously closed gate associated with that bin opens;

legs attached to the container;

a feeder plate positioned below the container bottom and attached to the legs, where the feeder plate is angled to urge feed located on feeder plate towards the ground;

a feeder lid connected to the container;

a solar panel attached to a top of the feeder lid;

a battery attached to the solar panel;

a motor attached to the battery; and motor controls attached to the motor, where the motor controls are configured to control the speed at which the motor operates.]

[9. The game feeder of claim 8, where the tripper is triangular shape and include a tripper lead end, where the feeder further comprises:

a drive gear attached to the motor at a location that is outside of the well;

a drive chain attached to the drive gear;

a first drive shaft gear attached to the drive chain, where the first drive shaft gear is positioned within the well;

a second drive shaft gear positioned in mechanical communication with the first drive shaft gear; and a trip chain positioned within the well and attached to the second drive shaft gear, where the tripper is attached to the trip chain.]

10. The game feeder of claim [8] *6*, where the container interior further is divided into second front bins and second rear bins, where the first front bins are positioned between the well and the second front bins and the first rear bins are positioned between the well and the second rear bins, where the latches are interior latches, where the cables are well cables, and where the trip dogs are first trip dogs, where the game feeder further comprises:

exterior latches attached to the container at a position that is outside of the container, where there is one well latch for each first front bin gate and each first rear bin gate, where there is one exterior latch for each second front bin gate and each second rear bin gate, where the latches include front well latches associated with the gates of the first front bins, rear well latches associated with the first rear bins, front exterior latches associated with the gates of the second front bins, and rear exterior latches associated with the gates of the second rear bins;

second trip dogs positioned with the well to interleave with the first trip dogs; and exterior cables, where the well cables are positioned within the well and attached between the first trip dogs and the well latches, and where the exterior cables are connected between the exterior latches and the second trip dogs, where the tripper is configured to move automatically past each bin to alternate between engaging a first trip dog and a second trip dog.

11. The game feeder of claim 10, where each bin is large enough to hold and dispense through the bin bottom corn attached to a corncob, where the corncob is at least four inches long and two inches in diameter.

*12. A game feeder, comprising:*

*a container having a container interior divided into a well positioned between first and second bins, wherein the container includes a container bottom, wherein each of the bins includes a gate connected to the container bottom such that the gate seals a bottom of the bin when closed and unseals the bottom of the bin when the gate is rotated to a position that is remote from the container bottom;*

*latches operatively connected to the container within the well, wherein there is one latch for each gate, wherein each latch is configured to retain the gate in a closed position and configured to rotate away from the gate to permit the gate to open;*

*a tripper positioned within the well, wherein the tripper is configured to move automatically past each bin to cause the latch to move far enough away from the gates so that a previously closed gate associated with that bin opens.*

*13. The game feeder of claim 12, where each bin is large enough to hold and dispense through the bin bottom corn attached to a corncob, where the corncob is at least four inches long and two inches in diameter.*

*14. The game feeder of claim 12, further comprising:*

*legs attached to the container; and*

*a feeder plate positioned below the container bottom and attached to the legs.*

*15. The game feeder of claim 14, where the feeder plate is angled to urge feed located on the feeder plate towards the ground.*

*16. The game feeder of claim 12, further comprising:*

*a solar panel operatively connected to the container;*

*a battery operatively connected to the solar panel;*

*a motor operatively connected to the battery; and*

*motor controls operatively connected to the motor, where the motor controls are configured to control the speed at which the motor operates.*

*17. The game feeder of claim 16, further comprising a feeder lid connected to the container, wherein the solar panel is attached to a top of the feeder lid, and wherein the motor is operatively connected to the tripper and operative to cause the tripper to move past each bin.*

*18. The game feeder of claim 12, wherein the gate is connected to the container bottom through a hinge and is rotated about the hinge.*

* * * * *